Dec. 16, 1969   P. A. WARD   3,483,702
FAN THRUST REVERSER FOR A JET PROPULSION PLANT
Filed June 28, 1967
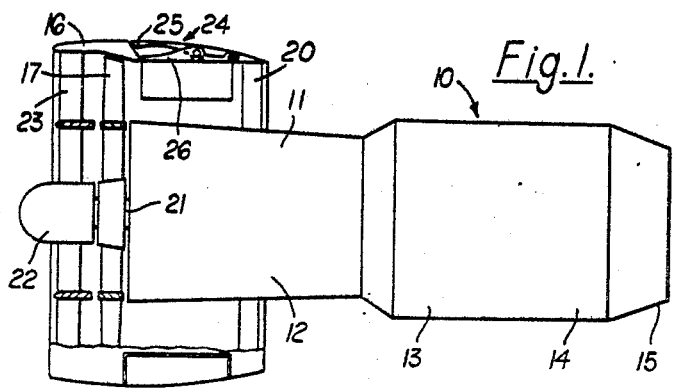
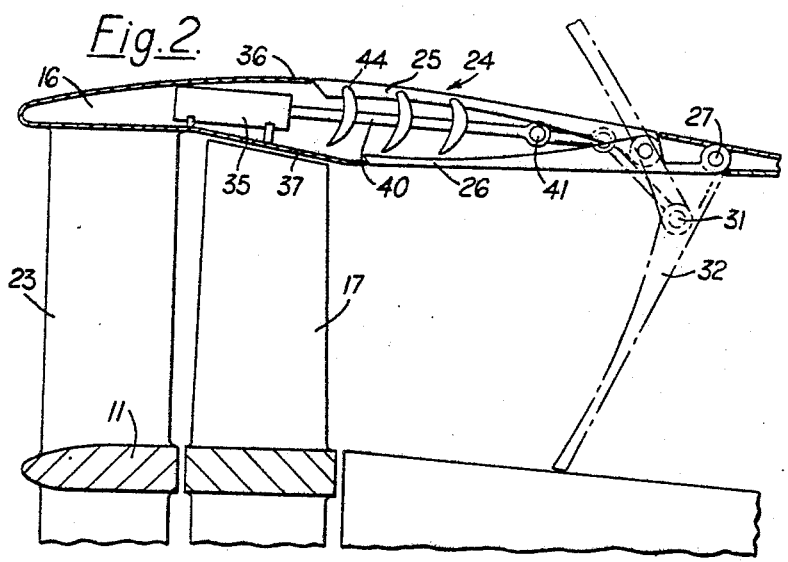
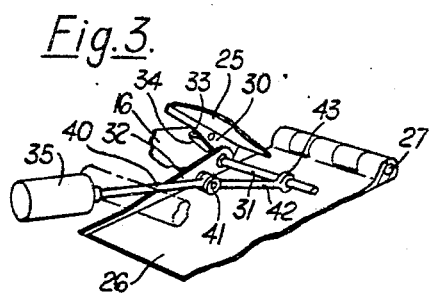
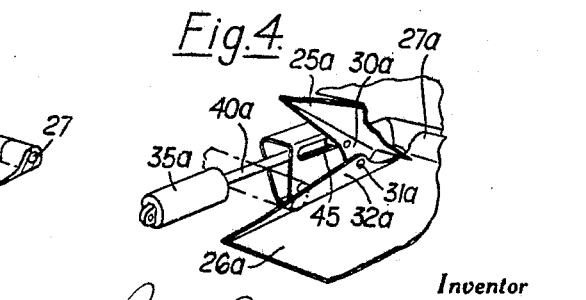
Inventor
Peter Arthur Ward
By Cushman, Darby & Cushman
Attorneys

United States Patent Office 3,483,702
Patented Dec. 16, 1969

3,483,702
FAN THRUST REVERSER FOR A JET
PROPULSION PLANT
Peter Arthur Ward, Derby, England, assignor to Rolls-
Royce Limited, Derby, England, a British company
Filed June 28, 1967, Ser. No. 649,526
Claims priority, application Great Britain, June 29, 1966,
29,274/66
Int. Cl. F02k 1/00, 3/02
U.S. Cl. 60—229          4 Claims

ABSTRACT OF THE DISCLOSURE

A thrust reverser has a casing provided with inner and outer flaps which are movable between an inoperative position, in which they merge into the casing, and an operative position, in which they extend outwardly of the casing and direct to gases upstream.

---

This invention concerns a thrust reverser, e.g. for a gas turbine engine.

According to the present invention there is provided a fan thrust reverser for a jet propulsion plant comprising a double walled casing, an inner casing spaced therefrom and defining an annular duct therebetween, a plurality of angularly spaced apart groups of radially aligned inner and outer thrust reverser flaps forming part of said double walled casing, the flaps of each of said group being pivotally mounted adjacent their downstream ends and being movable between an inoperative position, in which they are disposed substantially parallel to each other and merge into the remaining part of the double walled casing to provide portions of the inner and outer walls thereof respectively, and an operative position in which their upstream ends respectively lie radially inwardly and outwardly of the said inner and outer walls and open a peripheral gap in the double-walled casing, said inner flaps extending across the annular duct and substantially completely obstructing the same so that a gas stream passing downstream through the annular duct will pass through the peripheral gap in the double walled casing and will be deflected upstream by the flaps, and means for moving the flaps between the inoperative and operative positions.

Each group of flaps may be provided with a respective hydraulic or pneumatic ram for moving the flaps between the said inoperative and operative positions.

Each ram may have a piston rod which is connected to at least one of the respective said flaps and which carries guide vanes which, in the said operative position of the flaps, assist in guiding the gas stream forwardly.

Each said piston rod may be pivotally connected to one flap of the respective said group such that downstream motion of said ram and piston rod will cause said group to move to the operative position, the group having another flap which is pivotally connected both to the said double walled casing and to the respective said one flap. Thus, each said other flap may be provided with pivot pins which are received in cam slots in the said double walled casing.

The said double walled casing may be that of a fan mounted concentrically about and driven by a gas turbine engine, said inner casing being that of the gas turbine engine. Thus, the fan may be a front fan.

The invention is illustrated, merely by way of example, in the accompanying drawings, in which:

FIGURE 1 is a diagrammatic view, partly in section, of a gas turbine front fan engine provided with a thrust reverser according to the present invention, FIGURE 2 is a broken-away sectional view on a larger scale of part of the structure shown in FIGURE 1, FIGURE 3 is a broken-away perspective view of part of the structure shown in FIGURES 1 and 2, and FIGURE 4 is a view similar to FIGURE 3 but illustrating a modification.

In FIGURE 1 there is shown a front fan gas turbine engine 10 having an engine casing 11 within which there are mounted, in flow series, low and high pressure compressors 12, combustion equipment 13, and high and low pressure turbines 14, and turbine exhaust gases being directed to atmosphere through an exhaust duct 15.

Mounted concentrically about the engine casing 11, and arranged at the upstream end of the latter, is an outer casing 16 which is double-walled and forms the shorud of a front fan 17.

The downstream end of the casing 16 is supported from the engine casing 11 by means of a plurality of angularly spaced apart struts 20. The low pressure compressor and low pressure turbine are mounted on a common shaft 21 which is journalled within a nose cone 22, the latter being connected to the upstream end of the casing 16 by means of a plurality of angularly spaced apart struts 23. The fan 17 is driven by the shaft 21.

The downstream portion of the casing 16 is provided with a thrust reverser 24 for effecting reversal of the thrust produced by the fan 17.

The thrust reverser 24 comprises a plurality of angularly spaced apart pairs of radially aligned outer and inner thrust reverser flaps 25, 26.

Each of the flaps 26 is mounted adjacent its downstream end on a pivot 27 carried by the casing 16. Each of the flaps 25 has side walls 30 which are mounted on a common pivot 31 which is itself mounted in side walls 32 of the respective flap 26. Each of the said side walls 30 is, moreover, provided with a pivot pin 33 which is received in a cam slot 34 in the casing 16.

Each pair of flaps 25, 26 is provided with a respective ram 35 which is mounted between inner and outer walls 36, 37 of the casing 16.

Each of the rams 35 has a piston rod 40 which is pivotally connected at 41 to a link 42 which it itself pivotally mounted at 43 on the pivot 31.

As will be clear from FIGURE 2, each piston rod 40 is movable by its ram 35 so as to move the respective flaps 25, 26 between inoperative positions, shown in full lines, and operative positions, shown in chain dotted lines.

In the inoperative position, the flaps 25, 26 of each pair thereof are disposed substantially parallel to each other and merge into the remaining part of the casing 16 so as, in effect, respectively to provide portions of the inner and outer walls 36, 37 thereof. In the inoperative position, moreover, the upstream ends of the flaps 25, 26 are disposed adjacent to each other.

In the operative position of the flaps 25, 26, however, the said upstream ends thereof respectively lie radially inwardly and outwardly of the outer and inner walls 36, 37 and open a peripheral gap in the casing 16, so that the air passing downstream through the casing 16 will pass through the peripheral gap and will be deflected upstream by the flaps 25, 26.

In order to assist this forward deflection of the air stream, each of the piston rods 40 carries a cascade of guide vanes 44 which assist in guiding the air stream forwardly.

In FIGURE 4 there is shown a modification which is generally similar to the arrangement shown in FIGURE 3 and which, for this reason, will not be described in detail. Parts of the FIGURE 4 construction which correspond to that of the FIGURE 3 construction have been given the same reference numerals with the addition of the suffix *a*.

In the FIGURE 4 construction, however, a ram 35*a* is employed having a piston rod 40*a* which is connected to a pin 45 secured to the respective flap 25*a*. The flap 25*a* is pivotally connected at 31a to the respective flap 26a, and this reciprocation of the piston rod 40a effects simultaneous movement of the flaps 25a, 26a between their operative and inoperative positions.

I claim:

1. A fan thrust reverser for a jet propulsion plant comprising a double walled casing, having an inner and an outer wall, an inner casing spaced therefrom and defining an annular duct between said inner casing and said inner wall, a plurality of angularly spaced apart groups of radially aligned inner and outer thrust reverser flaps forming part of said double walled casing, the flaps of each said group being pivotally mounted adjacent their downstream ends and being movable between an inoperative position, in which they are disposed substantially parallel to each other and merge into the remaining part of the double walled casing to provide portions of the inner and outer walls thereof respectively, and an operative position in which their upstream ends respectively lie radially inwardly and outwardly of the said inner and outer walls and open a peripheral gap in the double walled casing, said inner flaps extending across the annular duct and substantially completely obstructing said annular duct so that a gas stream passing downstream through the annular duct will pass through said peripheral gap in the double walled casing and will be deflected upstream by said flaps, a respective ram for moving said flaps of each group between the inoperative and operative positions, said ram having a piston rod which is connected to one flap of the respective said group in a manner such that downstream motion of said ram will cause said flaps to move to the operative position, the other flap of the group being pivotally connected to both said double walled casing and the respective one flap, and guide vanes on said piston rod which in said operative position of the flaps are positioned to assist in guiding the gas stream forwardly.

2. A thrust reverser as claimed in claim 1 in which each said other flap is provided with pivot pins which are received in cam slots in the said casing.

3. A fan thrust reverser as claimed in claim 1 in which the said double walled casing is that of a fan mounted concentrically about and driven by a gas turbine engine said inner casing being that of the gas turbine engine.

4. A fan thrust reverser as claimed in claim 3 in which the fan is a front fan.

References Cited

UNITED STATES PATENTS

| | | | |
|---|---|---|---|
| 3,262,268 | 7/1966 | Beavers | 60—226 |
| 3,262,269 | 7/1966 | Kutney et al. | 60—226 |
| 3,262,270 | 7/1966 | Beavers | 60—226 |
| 3,262,271 | 7/1966 | Beavers | 60—226 |
| 3,280,561 | 10/1966 | Kutney | 60—226 |
| 3,036,431 | 5/1962 | Vdolek | 60—229 |
| 2,798,362 | 7/1957 | Rainbow et al. | 239—265.29 |
| 2,802,333 | 8/1957 | Price et al. | 60—229 |
| 2,945,346 | 7/1960 | Arnzen | 239—265.29 |
| 3,172,256 | 3/1965 | Kerry et al. | 60—229 |
| 3,279,182 | 10/1966 | Helmintoller | 60—226 |

FOREIGN PATENTS

| | | |
|---|---|---|
| 214,408 | 10/1957 | Australia. |
| 800,770 | 9/1958 | Great Britain. |

AL LAWRENCE SMITH, Primary Examiner

U.S. Cl. X.R.

60—226; 239—265.29